United States Patent [19]

Taylor

[11] 4,277,316

[45] Jul. 7, 1981

[54] SOLVENT EXTRACTION PROCESS

[76] Inventor: Robert A. Taylor, 368 Ferry Point Rd., Pasadena, Md. 21122

[21] Appl. No.: 100,132

[22] Filed: Dec. 4, 1979

[51] Int. Cl.³ .............................................. B01D 3/08
[52] U.S. Cl. .................................... 203/99; 196/112; 203/DIG. 11; 203/DIG. 22; 203/DIG. 25
[58] Field of Search ............... 202/163, 165, 175, 176, 202/237, 238; 203/99, 25, 21, 100, DIG. 11, DIG. 22, DIG. 25; 13/10; 366/24, 25, 44, 22, 23; 159/6, 25; 34/108; 196/112; 210/71

[56] References Cited

U.S. PATENT DOCUMENTS

| 1,748,178 | 2/1930 | Hume | 196/112 |
| 4,203,806 | 5/1980 | Diggs | 203/DIG. 25 |

FOREIGN PATENT DOCUMENTS 621926  6/1961  Canada ...................................... 366/44

OTHER PUBLICATIONS

"A Road Building Story", Engineering News; 21 Mar. 1912; pp. 43.

Primary Examiner—Frank Sever
Attorney, Agent, or Firm—Stevens, Davis, Miller & Mosher

[57] ABSTRACT

Solvents are separated from solvent bearing material by feeding the material to the open end of a reactor vessel rotatable about a substantially horizontal axis. The vessel has internal vanes operable to move the material from the open end towards the closed other end of the vessel when the vessel is rotated in one direction, and to move the material towards the open end when the vessel is rotated in the opposite direction. The reactor vessel is heated to a predetermined temperature while rotating the vessel in the one direction to cause solvent to be distilled from the material, and distilled gases are collected from the open end of the vessel and subsequently cooled to condense the distillate. The heating of the vessel is continued to a temperature high enough to produce a free-flowing residue when the reactor vessel is cooled. The vessel is then cooled and rotated in the opposite direction to cause the residue to be discharged from the open end of the vessel.

4 Claims, 1 Drawing Figure

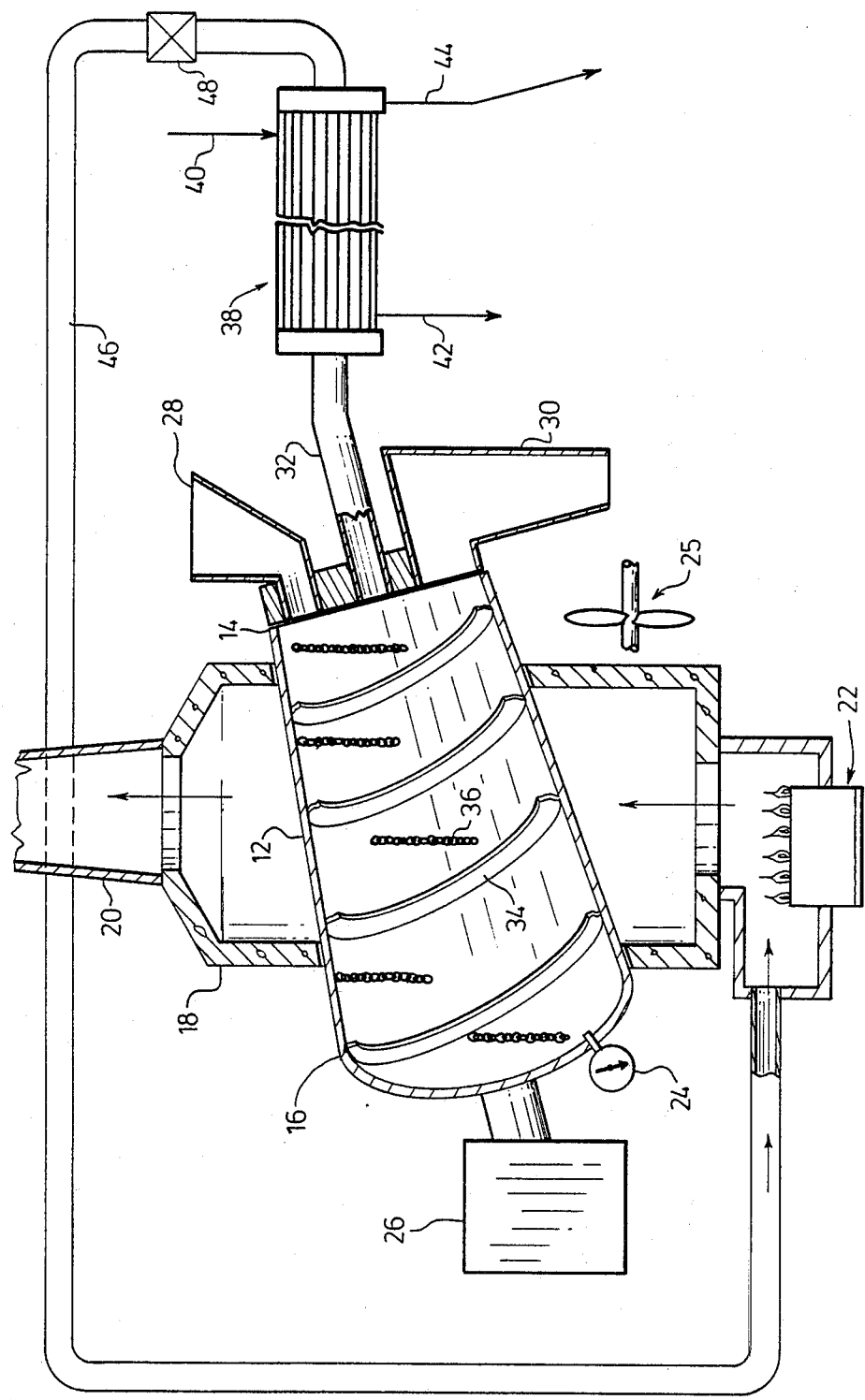

SOLVENT EXTRACTION PROCESS

The present invention relates to the separation of solvents from solvent bearing materials, namely solids, sludges and liquids which contain solvents, especially such materials which are difficult to handle. Such solvent bearing materials are frequently produced as waste by-products in manufacturing and chemical industries. Examples of such wastes are heavy accumulated paint sludges collected from paint lines such as are found in appliance and automobile manufacturing plants, bottom fractions from the fractionating columns used to separate various fractions of fluids, accumulated sludges from oil refinery distillation columns, and solvent bearing sludges made up of the combined residues from drums processed by the drum reconditioning industry.

In the past, the only accepted method of recovering solvents present in such waste material was to distill off the solvents in a pot still. A major disadvantage of this method is that the residue after distillation is usually a baked solidified mass which is extremely difficult to remove from the pot still and has to be removed by hand using tools such as hammers, chisels, etc. Also, the solid residue often still contains solvents which make the residue unacceptable for dumping because of environmental considerations.

An object of this invention is therefore to provide a process for separating solvents from solvent bearing material which not only enables substantially all the solvents to be recovered in a satisfactory manner, but also leaves a freeflowing solid residue which is easily removed from the reactor. Another object is to provide a process of this kind which can be carried out without causing air pollution problems, and which produces a final residue which can either be re-used or is a chemically inert sand-like material which can be disposed of at a landfill site with no danger to the environment.

According to the invention, a process for separating solvents from solvent bearing material comprises feeding material into one end of a reactor vessel rotatable about a substantially horizontal axis and having internal vanes operable to move the material from said one end towards the other end of the vessel when the vessel is rotated in one direction and to move the material towards said one end when the vessel is rotated in the opposite direction, heating the reactor vessel to a predetermined temperature while rotating the vessel in said one direction to cause solvent to be distilled from the material, collecting distilled gases from said one end of the vessel and cooling said gases to condense the solvent, continuing the heating of the vessel to a temperature high enough to produce a free-flowing residue when the vessel is cooled, cooling the vessel, and rotating the vessel in said opposite direction to cause the residue to be discharged from said one end of the vessel.

Thus, the solvents can be readily recovered by heating the vessel to a temperature which can be predetermined by laboratory tests, and the final residue can be produced in free-flowing form in a vessel having the features specified by heating to the high enough temperature which can also be predetermined by simple laboratory tests. Also, air pollution is minimized since all the gases emitted from the reactor can be collected.

The non-condensable gases from the vessel may be fed from the condensing step to a heating step and burnt to provide heat therefor. The free-flowing residue may be a chemically inert sand-like material which is environmentally acceptable for use as landfill. Alternatively, the solvent bearing material may for example comprise spent nickel-containing catalyst, with the free-flowing residue being re-usable as nickel-containing catalyst.

The present invention also provides apparatus for carrying out the process comprising a reactor vessel rotatable about a substantially horizontal axis, means for rotating the vessel in opposite directions, said vessel having an inlet at one end and internal vanes operable to move material in the vessel from said one end towards the other end when the vessel is rotated in one direction and to move the material in the vessel towards one end when the vessel is rotated in the opposite direction, means for heating the vessel to a predetermined temperature, condensing means operable to receive said gases and condense condensable gases therein, and discharge means at said one end of the vessel.

The heating means may comprise a fire box within which the vessel is partially contained. The apparatus may also include means for feeding non-condensable gases from the condensing means to the heating means for combustion therein.

The apparatus may also include cooling means such as a fan for cooling the reactor vessel.

Apparatus according to the invention is simple and effective, with discharge of the final free-flowing residue from the reactor vessel at the end of the process being effected by reversing the direction of rotation of the vessel.

One embodiment of the invention will now be described by way of example, with reference to the accompanying diagrammatic drawing of apparatus for separating solvents from solvent bearing material in accordance with a preferred embodiment of the invention.

Referring to the drawing, solvent-separating apparatus comprises a reactor vessel 12 somewhat similar to a conventional concrete mixing drum mounted for rotation about a substantially horizontal axis, the axis being slightly inclined to the horizontal so that one end 14 of the vessel 12 is slightly higher than the other end 16.

The vessel 12 is partly surrounded by a fire box 18, so that the ends 14, 16 of the vessel project from opposite sides of the fire box 18. The fire box 18 has a chimney 20 at the top and a gas or oil fuel burner 22 at the base. The burner 22 is manually controlled in accordance with the temperature in the fire box 18 are indicated by a temperature measuring device 24, so that the interior of the vessel 12 can be maintained at a predetermined temperature. The fire box 18 is also provided with a fan 25 for cooling the interior thereof by blowing in outside air when required.

Rotatable drive means 26 are provided adjacent the end 16 of the vessel 12, the end 16 being a closed end. The drive means 26 is operable to rotate the vessel 12 in one direction or the other.

The other end 14 of the vessel 12 is provided with a charge hopper 28 through which material can be charged into the vessel 12, a discharge chute 30 through which material from the vessel can be discharged, and means 32 for receiving gases emitted from the vessel 12. The charge hopper 28, discharge chute 30 and gas receiving means 32 form a unit which seals against the end 14 of the vessel 12, and the charge hopper 28 and discharge chute 30 can be closed during operation of the process so that gases emitted from the vessel can only leave through the gas receiving means 32.

The interior of the vessel 12 is provided with spiral-type vanes 34 secured to the interior walls of the vessel, and oriented in such a manner that when the vessel is rotated in one direction, material in the vessel is moved from the end 14 towards the closed end 16 and, when the vessel is rotated in the opposite direction, material is moved towards the end 14. Chains 36 are secured to the vanes 34 to break up lumps of material as the vessel rotates and to remove material from the vanes 34 and the interior wall of the vessel.

The gas receiving means 32 feeds the gases from the vessel 12 into a condenser 38 through which cooling water is passed, the condenser 38 having a water inlet 40 and a water outlet 42. Condensed gases, i.e. solvent distillate, leaves the condenser 38 through a line 44 from which it is fed into a storage container. Non-condensable gase leave the condenser 38 through a conduit 46, which contains a shut-off valve 48, and are passed to the burner 32 to provide fuel therefor.

The vessel 12 may for example have a volume corresponding to that of a 1,000 to 2,000 gallon tank, and may be slightly tapering with the end 14 being somewhat smaller than the other end 16.

In use, solvent-bearing material in the form of solids, sludge or liquid is fed into the vessel 12 through the charge hopper 28 while the vessel 12 is rotated to cause the vanes 34 to move the material towards the closed end 16.

After an appropriate amount of material has been fed into the vessel 12, the charge hopper 28 is closed. The discharge chute 20 is of course also closed at this stage of the process.

The fire box 18 is then heated by burning oil or gas in the burner 22 until the interior of the vessel 12 reaches a predetermined temperature. This temperature is predetermined by analyzing a small sample of the material in a laboratory to determine the nature of solvents in the material and to determine the optimum temperature range for distilling the solvents from the material. For example, if the recovered solvents are to be of high quality, the accidental distillation of undesirable solvents with higher boiling points must be avoided.

The vessel 12 is maintained at the desired tmperature for some time and the distilled gases are passed by the gas receiving means 32 to the condenser 38, where the solvent gases condense and leave the condenser 38 through the outlet line 44. Non-condensed gases are passed to the burner 22 through the conduit 46.

After substantially all the desired solvent has been distilled off at the predetermined temperature, the condenser outlet line 44 is diverted to another container, and the interior of the vessel 12 is raised to a higher temperature, which is also predetermined by experiment, by appropriate control of the burner 22 to distill off any remaining solvents to drive off undesirable hydrocarbons in the material, and to cause the residue to be of such a nature that it is free-flowing when cooled.

During the time that the vessel is heated, rotation of the vessel 12 in the original direction is continued, with the chains 36 breaking up lumps which may form. After the vessel 12 has been at the higher temperature for an appropriate length of time, heating is discontinued and the vessel 12 and fire box 18 are cooled by operation of the fan 25, with rotation of the vessel 12 in the original direction being continued.

When the vessel has substantially cooled, the direction of rotation of the vessel 12 is reversed, with the result that the vanes 34 move the residue, which is in free-flowing form, to the end 14 from which the residue passes into the discharge chute 30 and is collected in an appropriate container.

The advantages of the invention will be readily apparent to a person skilled in the art from the above described preferred embodiment. Solvents can be readily recovered, while the residue is left in a free-flowing form which is easily discharged from the reactor. Because the gases emitted from the reactor are either condensed or burnt to assist heating the fire box 18, air pollution is minimized and energy is conserved as much as possible. Various different solvents can be recovered by means of the present invention, for example ketones, toluene, benzene, alcohols and other hydrocarbons.

In some instances, the residue may be a chemically inert sand-like material which can be disposed of at a landfill site without danger to the environment. The invention is also useful for separating solvents from spent nickel catalyst such as is used in the production of aniline from nitrobenzene or in vegetable oil hydrogenation, and in such cases the residue is frequently re-usable as nickel catalyst in such processes.

Specific examples of the invention will now be described.

EXAMPLE 1

Liquid waste contained 13% dissolved and suspended solids in a solvent mixture consisting mainly of methyl ethyl ketone with minor amounts of toluene, ethylene glycol ethers and water. The solids consisted of polymeric materials soluble in the solvent mixture, insoluble organic and inorganic pigments and fillers. 1500 gallons (11,600 pounds) of liquid waste was charged to the reactor vessel and rotation started. The vessel was heated to raise the temperature of the mixture to 75° C., and the internal temperature was maintained between 75° and 100° C. for 6 hours. The high quality distillate product was of very low colour and had a boiling point range of from 72° to 80° C. 1343 gallons of methyl ethyl ketone distillate was produced and represented a recovery of 84% of the original charge weight.

After removal of the recoverable solvent, 50 pounds of 20% (wt/wt) lime slurry was added, the distillate receiver diverted, and the reactor vessel was heated to an internal temperature in the range of 230° to 260° C. The temperature was maintained at this level for 6 hours. 365 pounds of distillate with an offensive oder was produced in this phase of the procedure and was burnt. After cooling to below 150° C., the free-flowing solid residue weighing 1450 pounds was easily discharged from the vessel by reversing rotation. The earthy brown to black residue was subsequently transported to a landfill site. To determine the degree of chemical inertness of the residue, a small sample was leach tested and found to meet environmental standards.

EXAMPLE 2

Liquid waste treated contained 24% dissolved and suspended solids in a solvent of methylene chloride and water. The solids were composed of dissolved epoxy resins, pigments and fillers. 1,000 gallons of this liquid waste was charged to the reactor vessel and rotation started. Heat was applied, raising the internal temperature to 40° C. The reactor was maintained at an internal temperature within the range of from 40° to 50° for 6 hours. 605 gallons of distillate was produced during this phase and was composed of a nearly colourless mixture of methylene chloride and water. This distillate product represented a recovery of 64.5% of the original charge weight.

The distillate receiver was then diverted and the reactor vessel further heated to an internal temperature within the range of 400° to 450° C. The temperature was maintained at this level for 8 hours. 1200 pounds of distillate produced during this phase was burnt. After the distillation process was complete, the reactor was cooled to below 150° C. Residue weighing 2500 pounds was free-flowing and was discharged for transportation to a landfill site.

EXAMPLE 3

Liquid waste treated contained 5.0% dissolved and suspended organic and inorganic solids in a solvent mixture of alcohols, ketones, esters, aliphatic and aromatic hydrocarbons and water. The solids consisted of paint pigments, including $TiO_2$, $ZnO$ and $Fe_2O_3$. A charge of 2880 gallons of this waste was placed in the reactor vessel, rotation started and heat applied. After one hour of heating, the initial boiling point was reached (40° C.) Heating continued for 4 hours until the experimentally determined maximum temperature (90° C.) was reached. 2760 gallons of distillate produce was produced and represented a recovery of 93.4% of the original charge weight. The recovered product burnt quite cleanly if the burner air supply was properly adjusted. 50 pounds of 20% (wt/wt) lime slurry was added and further heat applied to the reactor vessel. The internal temperature was raised to within the temperature range of from 300° to 450° C. and maintained at that level for 6 hours. 287 pounds of gases were produced during this stage and were burnt. After the process was completed, the reactor was cooled to below 150° C. Residue weighing 1013 pounds was free-flowing and easily discharged from the reactor, and was subsequently transported to a landfill site for disposal.

EXAMPLE 4

The production of aniline from nitrobenzene produces a liquid waste composed of spent Raney nickel catalyst mixed with aniline, methanol and water. 1800 gallons (31,200 pounds) of this nickel bearing waste was charged to the reactor unit. Rotation was started and heat applied, raising the internal temperature of the mixture to 300° C. After one hour of rotation at 300° C., the reactor was allowed to cool to a temperature of 38° C. 17,000 pounds of finely powdered to gravel size lumps of regenerated nickel catalyst were removed from the reactor and stored under water. The composition of the recovered nickel was of a high enough quality to be re-used as a nickel catalyst. 1610 gallons of distillate were condensed and further processed to recover the contained aniline.

EXAMPLE 5

Vegetable oil hydrogenation produces a solid waste composed primarily of spent nickel catalyst, fatty glycerides and water. 14,000 pounds of such a nickel bearing waste were charged to the reactor, rotation was started and heat applied. An internal temperature of 400° C. was reached after 2 hours of heating. After 5 hours of rotation at a temperature in the range of from 400° to 430° C., the reactor was allowed to cool to a temperature of 38° C. 7,000 pounds of free-flowing nickel product were removed and stored under water. 730 gallons of condensed distillate produced was made up of a waxy brown mixture of partly decomposed fatty glycerides and water. The distillate could have been further processed to produce a burnable fuel oil. 1600 pounds of non-condensable gases were burnt.

If desired, instead of the burner 22 being controlled manually to maintain the interior of the reactor vessel 12 at a predetermined temperature, the burner may be automatically controlled to maintain the pedetermined temperature by providing a temperature measuring device which controls the burner.

Also, instead of the reactor vessel being partially contained in a fire box, the reactor vessel may be heated by immersion in an inert salt or oil bath, or by use of a heating jacket.

Other embodiments and examples of the invention will be readily apparent to a person skilled in the art, the scope of the invention being defined in the appended claims.

What I claim as new and desire to protect by Letters Patent of the United States is:

1. A process for separating solvents from solvent bearing material, comprising providing a reactor vessel rotatable about a substantially horizontal axis and having internal vanes operable to move the material from one end towards the other end of the vessel when the vessel is rotated in one direction and to move the material towards said one end when the vessel is rotated in the opposite direction, feeding said material to said one end of the realtor vessel, heating the reactor vessel to a predetermined temperature while rotating the vessel in said one direction to cause solvent to be distilled from the material, collecting distilled gases from said one end of the vessel and subsequently cooling said gases to condense the distillate,, continuing the heating of the vessel to a temperature high enough to produce a free-flowing residue when the reactor vessel is cooled, cooling the vessel, and rotating the vessel in said opposite direction to cause the residue to be discharged from said one end of the vessel.

2. A process according to claim 1 wherein non-condensable gases from the vessel are fed from the condensing step to the heating step and are burnt to provide heat therefor.

3. A process according to claim 1 wherein the free-flowing residue is a chemically inert sand-like material which is environmentally acceptable for use as landfill.

4. A process according to claim 1 wherein the solvent bearing material comprises spent nickel-containing catalyst, and the free-flowing residue is re-usable as nickel-containing catalyst.

* * * * *